(12) United States Patent
Mouri et al.

(10) Patent No.: US 6,503,962 B1
(45) Date of Patent: *Jan. 7, 2003

(54) SYNTHETIC RESIN COMPOSITION

(75) Inventors: Tomiko Mouri, Aichi-gun (JP); Kazuhiro Fukumoto, Aichi-gun (JP); Seiji Onoda, Aichi-gun (JP); Yoshio Yamada, Toyota (JP); Hideki Ohno, Toyota (JP); Masako Furuta, Kariya (JP); Akihiro Matsuyama, Kariya (JP); Shigeyoshi Miura, Chuo-ku (JP); Shirou Ueda, Chuo-ku (JP)

(73) Assignees: Toyoda Boshoku Corporation, Kariya (JP); Dainippon Ink and Chemicals, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,470

(22) Filed: Dec. 9, 1999

(30) Foreign Application Priority Data

Dec. 9, 1998 (JP) .............................. 10-350239
May 31, 1999 (JP) .............................. 11-152083
Aug. 27, 1999 (JP) .............................. 11-241313

(51) Int. Cl.$^7$ ................................. A61L 3/00
(52) U.S. Cl. ................. 523/102; 442/118; 442/121; 442/139; 442/146; 428/905
(58) Field of Search ................. 524/492; 523/102; 442/96, 111, 116, 155, 121, 227, 228; 428/241, 242, 244, 905

(56) References Cited

U.S. PATENT DOCUMENTS

| | | | | |
|---|---|---|---|---|
| 5,486,356 A | * | 1/1996 | Yim | 424/76.1 |
| 5,622,778 A | * | 4/1997 | Horii et al. | 442/118 |
| 5,872,072 A | * | 2/1999 | Mouri et al. | 502/208 |
| 5,981,425 A | * | 11/1999 | Taoda et al. | 502/208 |
| 5,985,169 A | * | 11/1999 | Miller et al. | 252/188.28 |
| 6,004,477 A | * | 12/1999 | Nakagawa et al. | 252/118.28 |

FOREIGN PATENT DOCUMENTS

| | | | |
|---|---|---|---|
| JP | 61-40120 | | 2/1986 |
| JP | 4-370161 A | * | 12/1992 |
| JP | 5-78591 | | 3/1993 |
| JP | 5-263358 | | 10/1993 |
| JP | 10-314577 | | 12/1998 |
| JP | 11-389 | | 1/1999 |

\* cited by examiner

Primary Examiner—Edward J. Cain
Assistant Examiner—Katarzyna W. Lee
(74) Attorney, Agent, or Firm—Oliff & Berridge, PLC (57) ABSTRACT

The present invention is for providing a synthetic resin composition capable of effectively deodorizing amine malodor causing substances such as trimethyl amine. In a synthetic resin composition comprising an aqueous medium, a surfactant, and a polymer latex and a filler dispersed in the aqueous medium by the surfactant, a transitional metal supported silica gel having at least one selected from the group consisting of a transitional metal and a transitional metal compound supported by a silica gel and an activated carbon were used as the filler. Since the transitional metal or the transitional metal compound has an performs extremely well as a Lewis acid, it forms a complex with a Lewis base having an unpaired electron. That is, a malodor causing substance such as amines and ammonia having a nitrogen atom with an unpaired electron can be adsorbed efficiently.

10 Claims, 4 Drawing Sheets

SYNTHETIC RESIN COMPOSITION

INCORPORATION BY REFERENCE

The disclosures of Japanese Patent Application Nos. HEI 10-350239 filed on Dec. 9, 1998, HEI 11-152083 filed on May 31, 1999, and HEI 11-241313 filed on Aug. 27, 1999 including the specifications, drawings and abstracts are incorporated herein by reference in their entirety.

BACKGROUND OF THE INVENTION

1. Field of the Invention

The present invention relates to a synthetic resin composition having the function of deodorizing malodor. A synthetic resin composition according to the present invention is used by being applied and dried on a fabric for a residence such as a carpet, a fabric for a vehicle interior covering material, or the like for the purpose of preventing fraying by binding fibers or improving the size accuracy. Related Art.

2. Description of Related Art

Recently, interest to the malodor in the residence or in the vehicle compartment has been heightened so that an effective measure for reducing the malodor is required. For example, for a residence, an adhesive not containing formaldehyde as the material, or plywood or furniture produced with a coating not containing formaldehyde as the material have been used in order to reduce the formaldehyde odor.

Moreover, also for an automobile, reduction of malodor from the air path of an air conditioner or malodor of cigarette smoke has been called for. Therefore, conventionally, a malodor adsorption function has been provided in a synthetic resin composition to be applied on an interior fabric covering material for preventing fraying by binding fibers or improving the size accuracy.

For example, the Japanese Patent Application Laid-Open (JP-A) No. 5-78591 discloses a synthetic resin composition with a polymer latex and a filler dispersed in an aqueous medium by a surfactant. It discloses that an adsorbent such as magnesium silicate hydrate clay mineral and activated carbon is used as the filler. By applying and drying the synthetic resin composition on a fabric covering material for an interior, the adsorbent can be disposed on the covering material evenly and stably so that the malodor inside the vehicle compartment can be adsorbed and deodorized. Moreover, since the conductivity is improved by use of the activated carbon, the function of eliminating static electricity can further be provided.

In the human living environment, malodor is generated in various places such as a toilet and a refrigerator. The malodor is perceived by stimulation of the olfactory sense by malodor causing substances contained in the air by a slight amount, such as nitrogen compounds including ammonia and amine, hydrogen sulfide, thiol, or the like. However, activated carbon used in a conventional synthetic resin composition as the adsorbent has a selectivity concerning the type of the malodor causing substances, and thus it is difficult to adsorb the malodor causing substance such as a nitrogen compound.

Then, the Japanese Patent Application Laid-Open (JP-A) No. 2-180633 and the Japanese Patent Application Publication (JP-B) No. 1-42744 propose improvement of the deodorizing performance by impregnating various kinds of impregnating agents to the activated carbon.

Moreover, the Japanese Patent Application Laid-Open (JP-A) No. 7-185324 discloses a deodorant using a silica gel having a 5 to 50 nm average pore size, a 0.5 to 2.0 ml/g pore volume and a 0.01 to 2 mm average particle size in place of the activated carbon, with a water-soluble metal salt absorbed by the silica gel. The deodorant has excellent fast acting property and persistency in deodorization.

Therefore, by providing the deodorants disclosed in the above-mentioned publications in a synthetic resin composition, and applying and drying the same on a fabric such as a carpet or a fabric covering material, the deodorizing function in the residence room or the vehicle compartment can-be improved.

However, even with an activated carbon impregnated with an impregnating agent involves a problem in that the adsorbing performance cannot be provided sufficiently in the actual use environment where a low concentration malodor causing substance exists.

Moreover, a deodorant with a water-soluble metal salt absorbed by a silica gel involves a problem in that the fast acting property and persistence of the deodorization are low under the environment where a particularly low amount of an amine malodor causing substance such as trimethyl amine exists.

SUMMARY OF THE INVENTION

In order to solve the problems, an object of the present invention is to provide a synthetic resin composition capable of effectively deodorizing amine malodor causing substances such as trimethyl amine.

A first aspect of a synthetic resin composition for solving the above-mentioned problems comprises an aqueous medium, a surfactant, and a polymer latex and a filler dispersed in the aqueous medium by the surfactant, wherein the filler is a transitional metal supporting silica gel having at least one selected from the group consisting of a transitional metal and a transitional metal compound supported by a silica gel carrier.

A second aspect of a synthetic resin composition is the synthetic resin composition according to the first aspect, further containing a flame retardant, wherein the polymer latex is prepared by emulsion polymerization in the presence of an emulsifier containing a styrenated phenylether nonionic emulsifier and an anionic emulsifier.

A third aspect of a synthetic resin composition is the synthetic resin composition according to the first or second aspect, wherein the filler further contains activated carbon.

Moreover, a fourth aspect of a synthetic resin composition is the synthetic resin composition according to the third aspect, wherein the filler contains the activated carbon by 5 to 90 wt. %.

Furthermore, a fifth aspect of a synthetic resin composition is the synthetic resin composition according to the first or second aspect, wherein the specific surface area of the silica gel carrier is more than 500 $m^2/g$ and 800 $m^2/g$ or less.

Moreover, a sixth aspect of a synthetic resin composition is the synthetic resin composition according to the first or second aspect, wherein the surfactant comprises a first polymer compound having a 10,000 or more weight-average molecular weight and a second polymer compound having a 150 or more and less than 10,000 weight-average molecular weight, and the first polymer compound is a nonionic polymer compound and at least one kind from the second polymer compound is a nonionic polymer compound.

Furthermore, a seventh aspect of a synthetic resin composition is the synthetic resin composition according to the sixth aspect, wherein the second polymer compound is a nonionic compound having a 12 or less HLB.

The HLB (hydrophile-lipophile balance) is defined as follows:

HLB=(molecular weight of the hydrophilic group portion/molecular weight of surfactant)×100/5={hydrophilic group weight/(hydrophobic group weight+hydrophilic group weight)}×100/5=(weight % of hydrophilic group)×(1/5).

An eighth aspect of a synthetic resin composition is the synthetic resin composition according to the seventh aspect, further containing aromatic alkylsulfonate having a 150 or more and less than 10,000 weight-average molecular weight as the surfactant.

Moreover, a ninth aspect of a synthetic resin composition is the synthetic resin composition according to the sixth aspect, wherein the nonionic polymer compound having a 10,000 or more weight-average molecular weight is a cellulose polymer compound.

Furthermore, a tenth aspect of a synthetic resin composition is the synthetic resin composition according to the second aspect, wherein the polymer latex is prepared by emulsion polymerization of a vinyl monomer.

Moreover, an eleventh aspect of a synthetic resin composition is the synthetic resin composition according to the second aspect, wherein the mixing ratio of the a styrenated phenylether nonionic emulsifier and the anionic emulsifier in the emulsifier is styrenated phenylether nonionic emulsifier/anionic emulsifier =50/50 to 95/5 based on the solid component weight ratio.

Furthermore, a twelfth aspect of a synthetic resin composition is the synthetic resin composition according to the first or second aspect, further containing an alcohol solvent.

DESCRIPTION OF THE PREFERRED EMBODIMENTS

The reason for difficulty in adsorbing malodor causing substances such as trimethyl amine in a conventional deodorant is considered that trimethyl amine has a bulky molecular structure so that it can hardly be introduced into the pores of the deodorant.

Therefore, the present invention adopts a transitional metal supporting silica gel having at least one selected from the group consisting of a transitional metal and a transitional metal compound supported by a silica gel carrier having a large specific surface area as the deodorant. Since the silica gel carrier in the transitional metal supporting silica gel has an extremely large specific surface area, the malodor causing substances can easily be adsorbed in the pores thereof. Moreover, since the transitional metal or the transitional metal compound has an extremely high performance as a Lewis acid, it forms a complex with a Lewis base having an unpaired electron. That is, a malodor causing substance such as amines and ammonia having a nitrogen atom with an unpaired electron can be adsorbed efficiently. Therefore, the malodor causing substance can be adsorbed selectively from the atmosphere containing a bulky malodor causing substance such as trimethyl amine in a low concentration.

According to the above-mentioned function, a fabric applied with a synthetic resin composition according to the present invention can effectively reduce a malodor causing substance so as to provide the excellent deodorant characteristics.

It is preferable that the silica gel carrier has a more than 500 $m^2/g$ and 800 $m^2/g$ or less specific surface area. With a silica gel carrier having a 500 $m^2/g$ or less specific surface area, the adsorption amount of the malodor causing substance such as trimethyl amine is decreased for an unknown reason. In contrast, with a more than 800 $m^2/g$ specific surface area, it becomes so minute that the handling property is deteriorated. Besides, since the pore size becomes extremely minute as well, it is difficult to adsorb a bulky malodor causing substance having a large molecular size such as trimethyl amine.

Moreover, it is preferable that the silica gel carrier has a 1 nm or more and less than 5 nm average pore size, a 0.1 ml/g or more and less than 0.5 ml/g pore volume and a 1 $\mu$m or more and less than 10 $\mu$m average particle size. In the case even one of the average pore size, the pore volume and the average particle size is outside the above-mentioned range, the deodorizing performance tends to be deteriorated.

As the transitional metal, either of the 3A to 7A, 8 and 1B groups of the element periodic table can be used. The elements of the 4 periods are preferable. Copper (Cu), iron (Fe), nickel (Ni), cobalt (Co), manganese (Mn) are recommended. Among these examples, copper (Cu) is particularly preferable. Moreover, examples of the transitional metal compound include nitrate, sulfate, chloride and acetate of these transitional metal elements. Among these examples, sulfate is particularly preferable, and copper sulfate is most preferable.

As the transitional metal and the transitional metal compound to be supported by the silica gel carrier, either one kind of or a plurality of the above-mentioned metals and metal compounds can be used. The supporting amount thereof is preferably in the range of 0.1 to 60 parts by weight based on 100 parts by weight of the silica gel carrier. With a less than 0.1 part by weight supporting amount, it is difficult to adsorb the malodor causing substance such as trimethyl amine. In contrast, with a more than 60 parts by weight supporting amount, the pores in the silica gel carrier are reduced so that the inherent silica gel carrier adsorbing ability is declined.

The above-mentioned transitional metal supporting silica gel can be produced, for example, by contacting a solution containing at least one selected from the group consisting of a transitional metal and a transitional metal compound with silica gel, and evaporation and drying the solvent for solidification. Moreover, for contacting the solution containing at least one selected from the group consisting of a transitional metal and a transitional metal compound with silica gel, a method of dispersing silica gel in a solution, a method of soaking silica gel in a solution, and a method of spray mixing silica gel and a solution at the same time can be used.

It is also preferable to further add activated carbon to a transitional metal supporting silica gel as a filler. The activated carbon has a 500 to 1,300 m²/g specific surface area and pores of mainly about 2 nm. Then, with the specific surface area and the pore size, the pores thereof serve as an adsorption site of sulfide malodor causing substances such as hydrogen sulfide, methylmercaptan, methyl sulfide and methyl disulfide, or hydrocarbon malodor causing substances such as toluene and styrene so as to improve the deodorant characteristics for these malodor causing substances.

As the activated carbon, activated carbons commonly used as a deodorant can be used. The activated carbons are produced by heating and carbonizing saw dusts, charcoal, coconut hust, lignate, peat, coal, pulp waste liquid, or the like. Furthermore, an activated carbon produced by the activation method can also be used. The activation method includes the chemical activation method and the gas activation method. An activated carbon produced by either activation method can be utilized. Examples of chemicals used in the chemical activation method include chemicals having dehydration action or fluxing action with respect to the material, such as zinc chloride, phosphoric acid, sulfuric acid, calcium chloride and sodium hydroxide, and chemicals having oxidizing action, such as potassium bichromate and potassium permanganate. In the gas activation method, first, the material is carbonized, and then, is contacted with a gas at a high temperature for activation. As the gas to be contacted, water vapor, carbon dioxide, air and a gas mixture thereof can be used.

Either of the activated carbons obtained as mentioned above can be used preferably in the present invention. In particular, those having a lot of micro pores are effective. Concretely, those produced from coconut hust as the material and activated by the gas activation method are most preferable.

The above-mentioned filler is used as granules or powders. By dispersing the same with a polymer latex in an aqueous medium by a surfactant, a synthetic resin composition according to the present invention is provided.

To the filler, in addition to the above-mentioned transitional metal supporting silica gels and the activated carbons, a conductive polymer material such as conductive carbon black, polyacetylene and polypyrrole, powders of a metal such as copper, aluminum and stainless steel, or a conductive fibrous substance such as carbon fiber and metal fiber can also be added. By further adding such a filler, conductivity can be provided to the fabric to be applied therewith so that generation of static electricity can be prevented.

The amount of the above-mentioned filler is preferably in the range of 50 to 200 parts by weight of the solid component of the filler based on 100 parts by weight of the solid component of a polymer latex. Within the range, the function of the filler can be performed sufficiently so that the inherent properties of the synthetic resin composition can be improved. That is, improvement of the size accuracy of the fabric and prevention of fraying of a thread or spread of the mesh can be achieved. Moreover, it is preferable that the activated carbon be contained by 5 to 90 parts by weight based on 100 parts by weight of the filler. Within the range, the adsorbing properties of the transitional metal supporting silica gel and the activated carbon can be performed sufficiently and multiplicatively.

It is preferable that the surfactant comprises a first polymer compound having a 10,000 or more weight-average molecular weight and a second polymer compound having a 150 or more. and less than 10,000 weight-average molecular weight. In the case a polymer compound having a less than 150 weight-average molecular weight is contained, the surfactant may enter into the deep part of the pores-of the filler resulting in deterioration of the function, or the surfactant itself is vaporized and becomes the source of malodor, or generate malodor by the chemical reaction with a substance existing in the atmosphere. Moreover, in the case of containing only the first polymer compound having a 10,000 or more weight-average molecular weight, the function as a protective colloid thickener is more salient than the function as a dispersing agent for helping peptization or dispersion of the filler secondary particles. Accordingly, the mesh structure of the protective colloid is formed in the state with insufficient peptization and dispersion of the filler secondary particles so that the degree of thickening becomes larger with a larger weight-average molecular weight. Therefore, in consideration of operativity and processability in production and use of a targeted synthetic resin composition, the viscosity needs to be adjusted appropriately by increasing the amount of the aqueous medium, and thus the solid component concentration at the time of application is lowered.

In contrast, in the case of containing only the second polymer compound having a 150 or more and less than 10,000 weight-average molecular weight, although the dispersing effect is provided, the thickening function is insufficient. Therefore, in order to increase the viscosity to the appropriate level for application, a surfactant of more than a necessary amount is required. However, if a large amount of the surfactant is used, the material cost is increased as well as the adverse effect onto the inherent function of the synthetic resin composition can be generated.

Therefore, it is preferable that the surfactant to be used in the present invention comprises a first polymer compound having a 10,000 or more weight-average molecular weight and a second polymer compound having a 150 or more and less than 10,000 weight-average molecular weight. The amount of the first polymer compound having a 10,000 or more weight-average molecular weight is preferably in the range from 0.1 to 20 parts by weight of the solid component of the surfactant based on 100 parts by weight of the solid component of the filler. Within the range, the formation and the thickening effect of the protective colloid can be extremely good. Moreover, the amount of the second polymer compound having a 150 or more and less than 10,000 weight-average molecular weight is preferably in the range from 0.3 to 10 parts by weight of the solid component of the surfactant based on 100 parts by weight of the solid component of the filler. Within the range, the dispersing effect of the filler is extremely high.

Examples of the first and second polymer compounds comprising the above-mentioned surfactant include synthetic polymers and cellulose derivatives. Examples of the synthetic polymers include polyphosphates such as sodium tripolyphosphate, sodium tetraphosphate and sodium hexametaphosphate, alkylaryl sulfonates such as sodium alkylnaphthalene sulfonate and sodium alkylbenzene sulfonate, and polyoxyalkylene arylethers such as polyoxyethylene phenolether and polyoxyethylenenonylphenolether. Furthermore, examples of the cellulose derivatives include nonionic cellulose derivatives such as methyl cellulose, hydroxyethyl cellulose, hydroxypropyl cellulose and hydroxyethylmethyl cellulose. In the present invention, at least one selected from the above-mentioned surfactants is used.

Furthermore, since the first polymer compound having a 10,000 or more weight-average molecular weight is a nonionic polymer compound and at least one kind from the second polymer compound having a 150 or more and less than 10,000 weight-average molecular weight is a nonionic polymer compound, the storage stability and the application stability can be ensured by inhibiting aggregation at a high temperature, such as in summer season.

The reason for the aggregation can be considered as follows. The transitional metal supported silica gel according to the present invention comprises a silica gel chemically bonded with, for example, a transitional metal compound. The chemically bonded transitional metal compound becomes a transitional metal ion (such as $Cu^{2+}$ ion) so as to be chemically bonded with an anionic (ionic) polymer compound such as sodium polyacrylate and carboxymethyl cellulose together with a hydroxyl group in the silica gel causing the aggregation. This phenomenon becomes conspicuous especially in a high temperature.

It is considered that the transitional metal contained in the transitional metal supported silica gel compresses and destabilizes an electric double layer, which is one of the principal elements for stabilizing an anionic emulsifier, a dispersing agent or an anionic polymer compound used for thickening in the polymer latex.

Further, it is considered that since an aqueous solution of a nonionic polymer compound having a 150 or more and less than 10,000 weight-average molecular weight has a low viscosity, it can easily enter into the gaps of the secondary particles of the filler so that peptization and dispersion of the secondary particles can be executed sufficiently as well as a protection layer of the nonionic polymer compound being formed so as to be stronger against the stability inhibiting function among the polymer latex particles of the transitional metal ion so that the stability is improved remarkably. That is, since at least one kind from the second polymer compound having a 150 or more and less than 10,000 weight-average molecular weight is a nonionic polymer compound, the second polymer compound can function as a dispersing agent of the filler so as to improve the dispersion property of the filler.

Moreover, when a nonionic polymer compound is used as the first polymer compound having a 10,000 or more weight-average molecular weight, a nonionic cellulose derivative provides a thickening property so as to serve as a protecting layer multiplicatively, and thus the dispersion property of the filler can further be improved.

As the nonionic polymer compound, nonionic cellulose polymer compounds such as methyl cellulose and hydroxyethyl cellulose, polyvinyl alcohol, polyoxyethylene nonyl ether, polyoxyethylene nonyl phenolether or the like, can be used. Among these examples of the nonionic polymer compounds, methyl cellulose and hydroxyethyl cellulose are preferable as the first polymer compound having a 10,000 or more weight-average molecular weight, and polyoxyethylene nonyl ether and polyoxyethylene nonyl phenolether are preferable as the second polymer compound having a 150 or more and less than 10,000 weight-average molecular weight.

A polymer latex is a principal element of the synthetic resin composition. In applying a synthetic resin composition according to the present invention, the polymer latex improves the size accuracy by binding fibers comprising a fabric with each other, prevents fraying of fibers, and serves as a binder for fixing the fabric by supporting an additive such as a filler.

As the polymer latex, both synthetic resin latex and rubber latex can be used. The synthetic resin latex comprises resin colloid particles as a dispersoid and water as a dispersion medium. At the time of drying a synthetic resin composition, the synthetic resin latex works effectively as a binder owing to adhesion among the resin colloid particles. Further, the rubber latex comprises rubber colloid particles as a dispersoid and water as a dispersion medium. At the time of drying a synthetic resin composition, it works effectively as a binder owing to adhesion among the rubber colloid particles.

Examples of the synthetic resin latex include poly(vinyl chloride) latex, poly(vinylidene chloride) latex, polyurethane latex, polyacrylate latex, poly(vinyl acetate) latex, polyacrylonitrile latex, a modified product thereof, and a copolymer thereof. Moreover, examples of the rubber of the rubber latex include styrene butadiene rubber, acrylonitrile rubber, acrylonitrile butadiene rubber, isoprene isobutylene rubber, polyisobutylene, polybutadiene, polyisoprene, polychloroprene, polyethylene propylene. At least one from the above-mentioned polymer latexes is used in the present invention.

Among the above-mentioned polymer latexes, those having a glass transition temperature (Tg) of the film thereof at $-70$ to $+35°$ C. are preferable. Since those having a less than $-70°$ C. glass transition temperature of the film thereof are too soft, a problem is involved in that the deodorization function is lowered by covering of the filler at the time of the film formation or the film becomes sticky, and thus they are inconvenient in terms of the physical property and the handling property. Moreover, those having a more than $+35°$ C. glass transition temperature of the film thereof are too hard, a problem is involved in that the filler may drop off at the time of application and process, or use, and further, the feeling is deteriorated. Furthermore, those having a $-70$ to $+15°$ C. Tg of the film thereof can provide a further preferable characteristic. As a polymer latex having a $-70$ to $+15°$ C. Tg of the film thereof, acrylic latex, ethylene-vinyl acetate latex, polyurethane latex and butadiene latex can be used preferably.

Among the above-mentioned polymer latex, an acrylic latex having a 0.2 to 0.6 $\mu$m average particle size can be used preferably. With the acrylic latex, a dense and flexible film can be formed as well as problems including function decline caused by covering the filler at the time of film formation, the film stickiness, decline of the storage stability and the bonding strength can be prevented completely.

Examples of the acrylic latex include a polymer emulsion containing (m-)acrylate as the main component. Examples of the (m-)acrylate as the main component include (m-)acrylates, such as methyl (m-)acrylate, ethyl (m-)acrylate, butyl (m-)acrylate, 2-ethylhexyl (m-)acrylate, glycidylester (m-)acrylate and 2-hydroxyethyl (m-)acrylate. A copolymerizable ethylenically unsaturated monomer can be used with the main component. Examples of the ethylenically unsaturated monomer include styrene, (m-)acrylonitrile, (m-)acryloamide, N-methylacryloamide, vinyl acetate, vinyl propionate, vinyl chloride, vinylidene chloride, (m-)acrylic acid, itaconic acid, fumaric acid, crotonic acid and maleic acid. In the case of using the monomer, the content of the (m-)acrylate as the main component is preferably 50 wt. % or more. Moreover, the acrylic latex is preferably formed by the emulsion polymerization process. For example, water, an ethylenically unsaturated monomer, an emulsifier and a radical polymerization catalyst are placed in a nitrogen-replaced reaction container, and then, heated and agitated so as to complete the polymerization at a predetermined temperature. The particle size of the acrylic resin can be controlled by adjusting the concentration of the emulsifier at the time of the emulsion polymerization.

The aqueous medium, which is a dispersing agent for dispersing the polymer latex particles and the filler, can contain a water-soluble polymer, an inorganic salt, or organic solvent. Moreover, the content of the aqueous medium can be determined optionally so as to provide an optimum viscosity in an application step to a container where the surfactant, the polymer latex and the filler are mixed within the range of the above-mentioned composition ratio.

In order to improve the deodorizing performance, it is preferable to apply a synthetic resin composition on a fabric after mechanical foaming as disclosed in the Japanese Patent Application Laid-Open (JP-A) No. 5-263358. Since application can be executed with the filler highly dispersed in the thin polymer film comprising the foams according to the method, the contact area between the filler and the air containing the malodor causing substances can be remarkably increased, and thus the high deodorization characteristic can be ensured with a small application amount.

Even with the mechanically foamed synthetic resin composition according to the present invention with the above-mentioned configuration, since the foaming property and the foam stability are not sufficient, a problem is involved in that a stable foaming process cannot be achieved. Therefore, in order to ensure the high deodorization characteristic, a large application amount to a fabric is required.

Therefore, it is preferable that the surfactant comprises a nonionic polymer compound having a 10,000 or more weight-average molecular weight and a nonionic polymer compound having a 150 or more and less than 10,000 weight-average molecular weight and a 12 or less HLB. Accordingly, since the foaming property and the foam stability are improved so that the mechanical foaming process is enabled, a high deodorization characteristic can be ensured with a smaller application amount.

Examples of a nonionic polymer compound having a 10,000 or more weight-average molecular weight include those presented above. Among these examples, nonionic cellulose polymer compounds such as methyl cellulose and hydroxyethyl cellulose are preferable. Further, examples of a nonionic polymer compound having a 150 or more and less than 10,000 weight-average molecular weight and a 12 or less HLB include a higher alcohol oxyethylene adduct, an alkylphenol oxyethylene adduct, polyhydric alcohol fatty acid ester, a polyhydric alcohol ester oxyethylene adduct, polyethylene glycol monoester and polyethylene glycol diester. With a more than 12 HLB, the foaming property and the foam stability of a nonionic compound having a 150 or more and less than 10,000 weight-average molecular weight are declined so that the deodorization performance is lowered.

The amount of a nonionic polymer compound having a 10,000 or more weight-average molecular weight is preferably in the range of 0.2 to 10 parts by weight based on 100 parts by weight of the solid component of the filler. Outside the range, the stability of the synthetic resin composition is insufficient so that the operativity is deteriorated due to thickening. Moreover, the amount of a nonionic compound having a 150 or more and less than 10,000 weight-average molecular weight and a 12 or less HLB is preferably in the range of 0.5 to 10 parts by weight based on 100 parts by weight of the solid component of the filler. With a less than 0.5 part by weight, the foaming property and the foam stability are poor, and with more than 10 parts by weight, the deodorization performance is declined.

As the surfactant, it is further preferable to contain an aromatic alkylsulfonate having a 150 or more and less than 10,000 weight-average molecular weight. Accordingly, the foaming property and the foam stability are further improved. Examples of the aromatic alkylsulfonate include sodium alkylbenzene sulfonate and sodium alkylnaphthalene sulfonate.

The amount of the aromatic alkylsulfonate is preferably in the range of 0.5 to 10 parts by weight based on 100 parts by weight of the solid component of the filler. With a less than 0.5 part by weight, the foaming property and the foam stability are poor, and with more than 10 parts by weight, the deodorization performance is declined.

A synthetic resin composition with the above-mentioned composition can be foamed mechanically by adjusting the non-volatile component to 35 to 60 wt. % and agitating with an oaks mixer while blowing in air. In general, it is used with a 1.5 to 6.0 expansion ratio. But in terms of the malodor adsorption ability and the bonding ability to the fabric, a 1.5 to 4.0 expansion ratio is preferable. So-called chemical foaming is not preferable since it provides a poor deodorization characteristic.

The amount of applying the mechanically foamed synthetic resin composition onto a fabric is preferably in the range of 30 to 200 g/m$^2$. With an application amount smaller than the range, the deodorization characteristic and the bonding strength are poor, and with a larger application amount, the effect is saturated as well as the feeling is deteriorated.

It is further preferable to contain an alcohol solvent in the synthetic resin composition. Accordingly, the permeability to the fabric coating material is improved without ruining the malodor causing substance adsorption property. Therefore, the bonding strength between the filler and the fabric is increased so that the persistence of the deodorization performance is improved. The reason thereof is considered that the surface tension of the polymer latex is lowered by adding an alcohol solvent.

Examples of the alcohol solvent include methyl alcohol, ethyl alcohol, n-propyl alcohol, isopropyl alcohol, n-butyl alcohol and isobutyl alcohol. It is preferable to use isopropyl alcohol since it is water-soluble and has a large permeability improving function. Moreover, the amount of the alcohol solvent can be set optionally according to the viscosity of the synthetic resin composition at the time of use, but it is preferably about 5 wt. %.

A flame retardant can further be added to a synthetic resin composition according to the present invention within the range of not ruining the characteristics thereof Moreover, a conductive agent, a foam adjusting agent, or the like, can be used within the range of not ruining the inherent performance.

Examples of the flame retardant include halogen compounds such as a phosphorus compound, a chlorine compound and a bromine compound, a guanidine compound, metal compounds such as an antimony compound and an aluminum compound, a boron compound and an ammonium compound. Concrete examples include monoammonium phosphate, red phosphorus, diammonium phosphate, triester phosphate, phosphite, phosphonium salt, triamide phosphate, paraffin chloride, dechloran, ammonium bromide, decabromo bisphenol, tetrabromo bisphenol A, tetrabromo ethane, decabromo diphenyl oxide, guanidine hydrochloride, guanidine carbonate, guanylurea phosphate, antimony oxide (antimony pentaoxide, antimony trioxide), sodium tetraborate hydrate (borax), ammonium sulfate and ammonium sulfamate.

The flame retardant should be homogeneously dispersed and stable in the synthetic resin composition. However, in the case a flame retardant is mixed in the synthetic resin composition with the above-mentioned composition, a problem may arise in that the dispersion state of the flame retardant is poor and thickening of the synthetic resin composition and production of the aggregates occur as time passes disturbing the long term storage stability. Therefore, in the case it is used as a deodorant by applying on a fabric covering material, performance of the flame retardant can be insufficient due to uneven distribution of the flame retardant.

Therefore, in the case of using a flame retardant, it is preferable to use a polymer latex obtained by emulsion polymerization in the presence of an emulsifier comprising a styrenated phenylether nonionic emulsifier and an anionic emulsifier. Accordingly, the dispersion property of the flame retardant is improved remarkably so that thickening of the synthetic resin composition and production of the aggregates as time passes can be prevented, and thus the stability can be improved dramatically. Then, in the case it is used as a deodorant being applied on a fabric covering material, since the flame retardant is distributed homogeneously with the targeted deodorization performance, a stable flame retarding property can be ensured.

As the styrenated phenylether nonionic emulsifier, various types such as polyoxyethlene styrenated phenylethers including polyoxyethylene styrenated phenylether and polyoxypropylene styrenated phenylether can be used. Among them, polyoxyethylene styrenated phenylether is particularly preferable. Examples of the alkylene oxides such as polyoxyalkylene styrenated phenylether include ethylene oxide and propylene oxide. Those having a 2 to 130 moles, preferably 5 to 100 moles of average addition molar number can be used alone or in combination of a plurality thereof.

Examples of the anionic emulsifier to be used with the styrenated phenylether nonionic emulsifier include polyoxyethylene alkylphenol sulfate and vinyl sulfonate.

The mixing ratio of the a styrenated phenylether nonionic emulsifier and the anionic emulsifier at the time of emulsion polymerization of the polymer latex is styrenated phenylether nonionic emulsifier/anionic emulsifier =50/50 to 95/5 based on the solid component weight ratio. In the case a polymer latex prepared by emulsion polymerization using an emulsifier with an anionic emulsifier of an amount less than the range is used, the dispersion property of the flame retardant is deteriorated. In contrast, in the case a polymer latex prepared by emulsion polymerization using an emulsifier with a styrenated phenylether nonionic emulsifier of an amount less than the range is used, the shelf stability of the synthetic resin composition is declined.

As a polymer latex prepared by emulsion polymerization using the above-mentioned emulsifier, one prepared by polymerization of a vinyl monomer is preferable. And it is preferable to select and use one or a plurality of the above-mentioned synthetic resin latexes or the rubber latexes.

As the surfactant to be used with the flame retardant, one comprising the above-mentioned first polymer compound having a 10,000 or more weight-average molecular weight, the second polymer compound having a 150 or more and less than 10,000 weight-average molecular weight, and the aromatic alkylsulfonate having a 150 or more and less than 10,000 weight-average molecular weight is preferable. It is preferable that the first polymer compound is a nonionic cellulose polymer compound such as methyl cellulose and hydroxyethyl cellulose, and at least one kind from the second compound is a nonionic polymer compound such as polyoxyalkylether and polyoxyethylene alkylphenolether.

Examples of the aromatic alkylsulfonate include sodium alkylnaphthalene sulfonate, a condensation product of sodium alkylnaphthalene sulfonate and a polycondensation product of sodium alkylnaphthalene sulfonate.

The amount of the first polymer compound is preferably in the range of 0.2 to 10 parts by weight based on 100 parts by weight of the solid component of the sum of the filler and the flame retardant. With a less than 0.2 part by weight, the stability of the flame retardant is insufficient, and in contrast, with more than 10 parts by weight, the application operativity is deteriorated due to a high viscosity. Moreover, the amount of the second polymer compound is preferably in the range of 0.3 to 10 parts by weight based on 100 parts by weight of the solid component of the sum of the filler and the flame retardant. Also the amount of the aromatic alkylsulfonate is preferably in the range of 0.3 to 10 parts by weight based on 100 parts by weight of the solid component of the sum of the filler and the flame retardant. In either case, with a less than 0.3 part by weight, the stability is insufficient, and in contrast, with more than 10 parts by weight, the deodorization performance is declined.

By using the above-mentioned polymer latex and surfactant with the flame retardant, the dispersion property of the flame retardant can be improved remarkably so that thickening of the synthetic resin composition and production of the aggregates can be prevented and thus the stability can be improved dramatically. Further, in the case it is applied on a fabric covering material as a deodorant, since the flame retardant can be distributed homogeneously together with the targeted deodorizing performance, a stable flame retarding property can be ensured.

A method for producing a synthetic resin composition according to the present invention is not particularly limited. For example, it can be produced by mixing a filler in a dry process, kneading the mixture with water with a surfactant dissolved therein, adding a polymer latex and kneading. Moreover, it can also be produced by mixing a filler and a surfactant in a dry process, dispersing the same in water, and adding a polymer latex, or by mixing a filler and a surfactant in a dry process, and kneading the same with a solution prepared by diluting a polymer latex in water.

Furthermore, in the above-mentioned production method, it is preferable to add a surfactant at a several times. For example, by using a small amount for the first time for protection colloid formation or as a dispersing agent, and adding more as a thickening agent after adding a polymer latex, the viscosity can be adjusted at the same time with production of the synthetic resin composition.

Hereinafter, the present invention will be explained more specifically with reference to examples, comparative embodiments and test examples.

(Embodiment 1)

A production method of a synthetic resin composition according to this example will be explained in place of detailed description of the configuration.

A polymer latex was prepared by emulsion polymerization of butyl acrylate, ethyl acrylate and acrylic acid by a 74:25:1 monomer composition by the weight ratio. The solid component of the polymer latex is 50 wt. %, and the Tg of the film is $-25°$ C. the Tg was measured by a dynamic viscous elasticity measuring device "Reometrict PSA 11" produced by Reometric Corp.

On the other hand, 140 ml of water was placed in a beaker, and 31.3 g of copper (II) 5 sulfate hydrate (20 g as anhydrous copper sulfate) was added thereto, and was agitated with a hot stirrer so as to be dissolved. 100 g of silica gel having a 700 m²/g specific surface area, a 2.5 nm average pore size, a 0.44 ml/g pore volume, and a 3.0 μm average particle size ("Silicia 730" produced by Fuji Silicia Chemical Corp.) was added to the aqueous solution. The water content thereof was evaporated by heating and agitating on the hot stirrer. When the water content was evaporated substantially, the beaker and the content were placed in a drier at 110° C. so as to be dried overnight for obtaining copper sulfate silica gel.

Then, 90 parts by weight of the copper sulfate silica gel and 90 parts by weight of an activated carbon having a 63 μm or less particle size were mixed in a dry process. A solution prepared by dissolving 0.9 part by weight of sodium alkylnaphthalene sulfonate (weight-average molecular weight: 342) as a surfactant and 5 parts by weight of carboxymethyl cellulose (weight-average molecular weight: 130,000) in 366 parts by weight of water was added thereto and was mixed with a biaxial mixer. Then, 200 parts by weight of the above-mentioned polymer latex was added and mixed so as to prepare a synthetic resin composition having a 33 wt. % of solid component.

The obtained synthetic resin composition was applied on the rear surface of a fabric comprising polyester fibers with a doctor blade by 100 g/m² by the solid component. Then, it was dried in a hot air drier at 130° C. for 30 minutes so as to obtain a vehicle interior covering material. The adhesion amount of the filler was 30 g/m² of the activated carbon and 30 g/m² of the copper sulfate impregnated silica gel.

(Embodiment 2)

In the process the same as the embodiment 1 except that the copper sulfate impregnated silica gel the same as the embodiment 1 was used by 60 parts by weight in place of 90 parts by weight, a synthetic resin composition according to the example 2 was prepared. In order to have the same viscosity and the same solid component as the synthetic resin composition according to the embodiment 1, the amount of the solution with the surfactant dissolved was 320 parts by weight, and the solid component of the obtained synthetic resin composition was 33 wt. %.

Similar to the embodiment 1, it was applied on a fabric and dried so as to obtain a vehicle interior covering material. The adhesion amount of the filler was 30 g/m² of the activated carbon and 20 g/m² of the copper sulfate impregnated silica gel.

(Embodiment 3)

In the process the same as the embodiment 1 except that the copper sulfate impregnated silica gel the same as the embodiment 1 was used by 30 parts by weight in place of 90 parts by weight, a synthetic resin composition according to the embodiment 3 was prepared. In order to have the same viscosity and the same solid component as the synthetic resin composition according to the embodiment 1, the amount of the solution with the surfactant dissolved was 270 parts by weight, and the solid component of the obtained synthetic resin composition was 34 wt. %.

Similar to the embodiment 1, it was applied on a fabric and dried so as to obtain a vehicle interior covering material. The adhesion amount of the filler was 30 g/m² of the activated carbon and 10 g/m² of the copper sulfate impregnated silica gel.

COMPARATIVE EXAMPLE 1

In the process the same as the embodiment 1 except that 90 parts by weight of Sepiolite was used in place of the copper sulfate impregnated silica gel, a synthetic resin composition according to the comparative example was prepared. The solid component of the obtained synthetic resin composition was 33 wt. %.

Similar to the embodiment 1, it was applied on a fabric and dried so as to obtain a vehicle interior covering material. The adhesion amount of the filler was 30 g/m² of the activated carbon and 30 g/m² of the Sepiolite.

<Adsorption Test>

Figure 1:
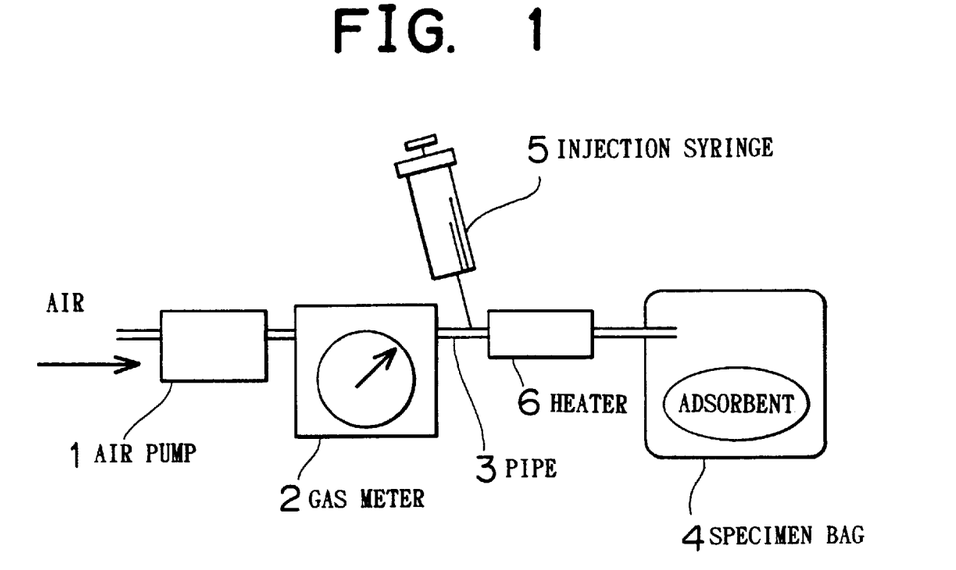
FIG. 1 is a schematic diagram for explaining an adsorption test device used in examples of the present invention.
Figure 2:
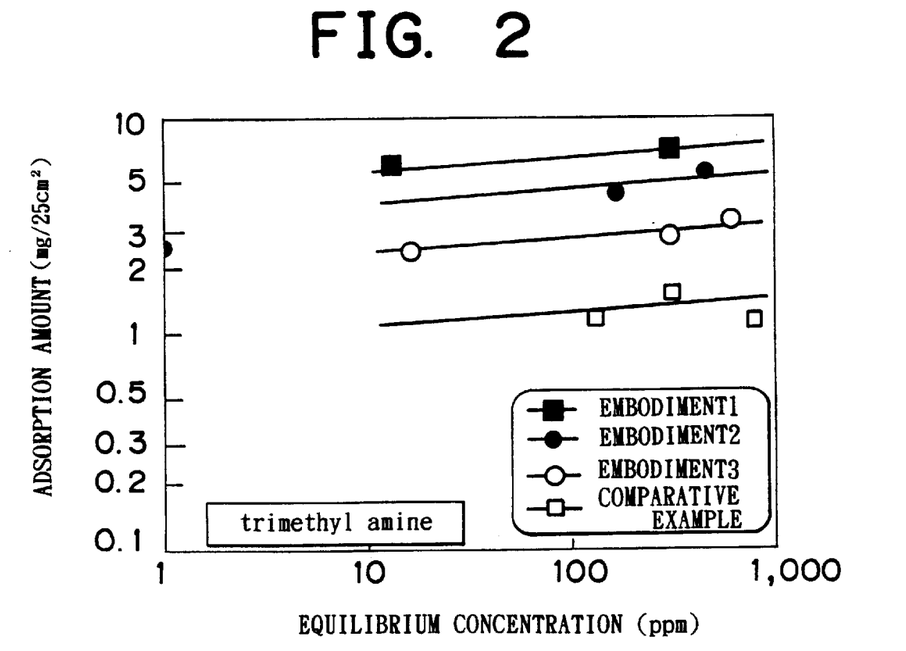
FIG. 2 is a graph showing adsorption isothermal lines of trimethyl amine by a covering material produced in examples and comparative examples.
Figure 3:
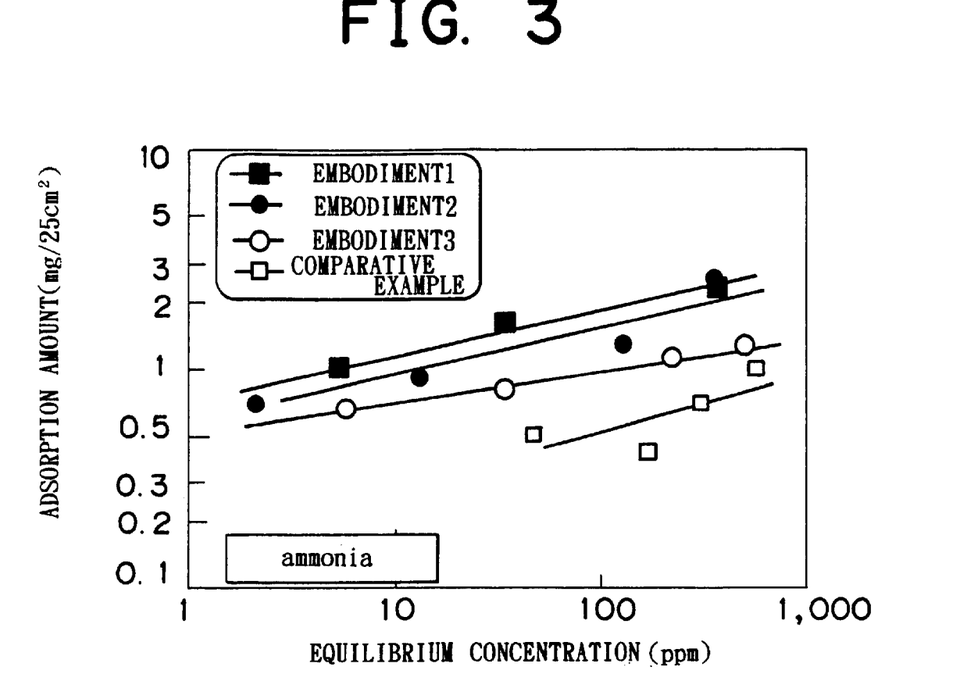
FIG. 3 is a graph showing adsorption isothermal lines of ammonia by a covering material produced in the examples and the comparative examples.
Figure 4:
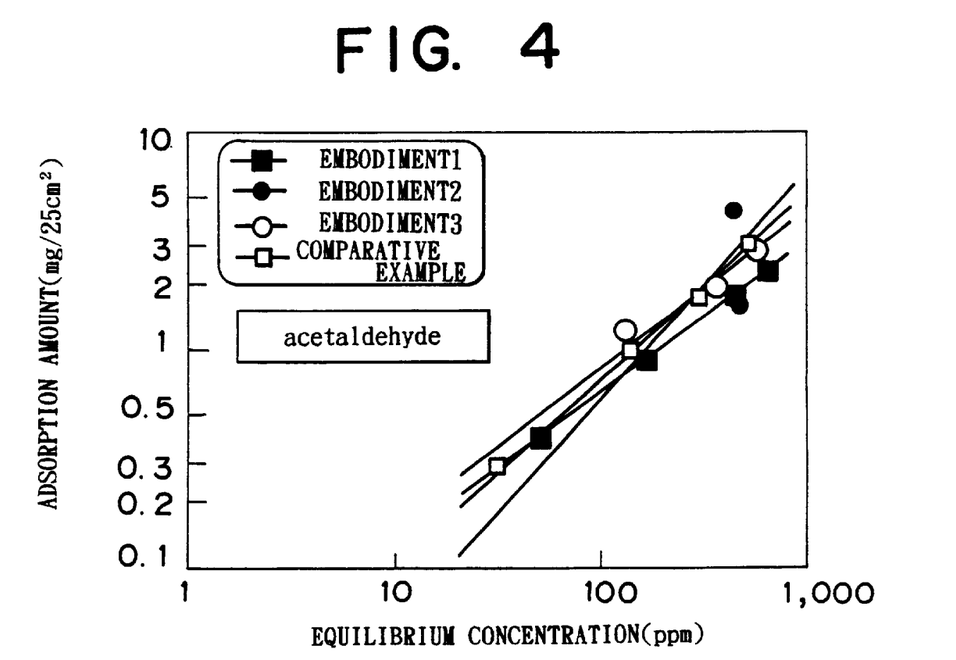
FIG. 4 is a graph showing adsorption isothermal lines of acetaldehyde by a covering material produced in the examples and the comparative examples.
Figure 5:
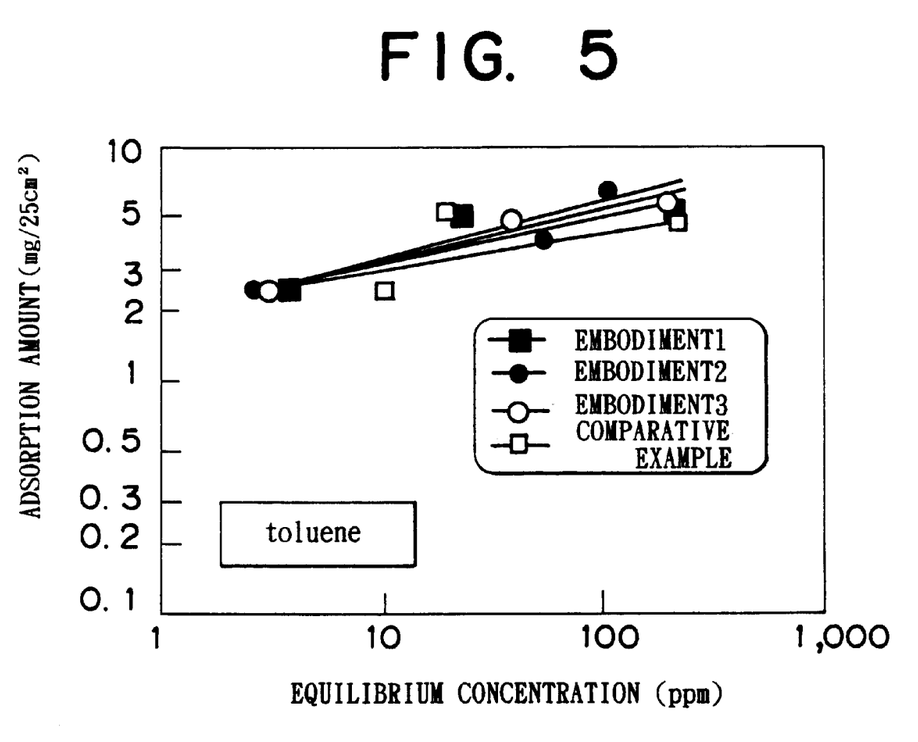
FIG. 5 a graph showing adsorption isothermal lines of toluene by a covering material produced in the examples and the comparative examples.

The four kinds of the covering materials obtained as mentioned above were cut into a 5 cm square size specimen. Each of them was placed in a gas impermeable specimen bag. The specimen bag 4 was each attached to an adsorption test device as shown in FIG. 1.

The adsorption test device comprises an air pump 1 having a cock (not illustrated) at the air inlet side, a gas meter (flow meter) 2 connected to the outlet side of the air pump 1, and a pipe 3 elongating from the gas meter 2, with the tip of the pipe 3 inserted into the specimen bag 4. Further, the pipe 3 is connected with an injection syringe 5. A heater 6 is provided at the downstream side of the pipe 3 with respect to the injection syringe 5.

Then, an aqueous solution of trimethylamine (concentration: 30 wt. %), an aqueous solution of ammonia (concentration: 28 wt. %), an aqueous solution of acetaldehyde (concentration: 30 wt. %) and toluene were prepared. They were injected into the pipe 3 from the injection syringe 5 by a predetermined amount. Air was suctioned from the air pump 1 by a predetermined flow rate by opening the cock (not illustrated) while each malodor causing substance was vaporized by heating with the heater 6 so as to introduce 5 liters of air containing the malodor causing substance into the specimen bag 4. At the time, the injection amount of each malodor causing substance was changed optionally so as to prepare each specimen bag.

Specimen bags with air containing each specimen and the above-mentioned four kinds of malodor causing substances with various concentrations were placed still in a constant temperature and humidity room maintained at 25° C. for 24 hours. The air inside the specimen bag was analyzed before and after placing still so as to measure the adsorption amount of the malodor causing substances onto the specimens.

Trimethyl amine, acetaldehyde and toluene were analyzed by a gas chromatograph, and ammonia was analyzed by a detecting tube. The initial concentration (Cb) of each malodor causing substance before placing still and the equilibrium concentration (Cs) after placing still for 24 hours were measured respectively. The adsorption amount (q) of the malodor causing substance adsorbed on the specimen was calculated by the formula 1. From the obtained result, the adsorption isothermal lines showing the relationship between the equilibrium concentration (Cs) and the adsorption amount (q) are formed respectively. Results are shown in FIGS. 2 to 5.

$$q = \frac{Mw \times V \times 273 \times (Cb - Cs)}{22.4 \times (273 + t) \times 10^3} \quad \text{[Formula 1]}$$

wherein,
q: adsorption amount (mg/25 cm²),
Mw: molecular weight of trimethyl amine, or ammonia, or acetaldehyde, or toluene,
V: volume of the specimen bag (L)
Cb: initial concentration (ppm)
Cs: equilibrium concentration (ppm), and
t: test temperature (°C.)

<Cigarette Stain Test>

The covering materials produced in the embodiments and comparative example were cut into a 40 cm square size specimen. Each of them was attached on the inner side surface of a cube-like acrylic box with 45 cm sides. At the time, the entire periphery of the specimen was sealed with a sealing tape.

12 pieces of cigarettes with the filter eliminated (product name "hi-lite", length of each piece: 6 cm) were lit and placed in the acrylic box. It was left for 24 hours with the lid closed. Thereafter, the specimen was taken out from the acrylic box and left in a room for 72 hours.

Then, the specimen was placed on the bottom portion of a clean acrylic box without odor, and left for 24 hours with the lid closed. It was evaluated by a sensory test. The sensory test was executed by smelling the odor in the box by 8 panelists in 2 groups with 4 members each. The odor strength and the degree of pleasantness and unpleasantness are indicated by the average value of the 8 panelists. Results are shown in Table 1.

The odor strength is indicated by the 6 grade odor strength indication method including "0: no odor", "1: odor barely sensed", "2: weak odor of something unknown", "3: easily sensed odor", "4: strong odor" and "5: powerful odor". Further, the degree of pleasantness and unpleasantness is indicated. by the 9 grade aversion indication method including "+4: extremely pleasant", "+3: very pleasant", "+2: pleasant", "+1: slightly pleasant", "0: neither pleasant nor unpleasant", "−1: slightly unpleasant", "−2: unpleasant", "−3: very unpleasant", and "−4: extremely unpleasant".

TABLE 1

|  | copper sulfate impregnated silica gel amount | odor strength | degree of pleasantness and unpleasantness |
| --- | --- | --- | --- |
| embodiment 1 | 30 g/m² | 2.6 | −1.2 |
| embodiment 2 | 20 g/m² | 2.6 | −1.0 |
| embodiment 3 | 10 g/m² | 3.0 | −1.5 |
| comparative example 1 | — | 3.2 | −1.6 |

<Evaluation>

From FIGS. 2 to 5, it is apparent that the adsorption performance of trimethyl amine and ammonia of the covering materials prepared in the embodiments is extremely superior to the comparative example. Apparently, it is the effect of using silica gel with the copper sulfate supported.

In contrast, as to acetaldehyde and toluene, difference can hardly be found between the embodiments and the comparative example. That is, the acetaldehyde and the toluene are considered to be adsorbed by the activated carbon contained in both embodiments and comparative example.

In comparison among the embodiments, one containing a larger amount of the silica gel with the copper sulfate supported has a larger adsorption amount of the triethyl amine and the ammonia. From the comparison between the embodiment 1 and the comparative example, by using the copper sulfate impregnated silica gel, the adsorption amount of trimethyl amine at the equilibrium concentration 10 ppm is about 5 times, and the adsorption amount of ammonia is about 4 times as much as that of the case of using the same amount of Sepiolite. Accordingly, the effect of the copper sulfate impregnated silica gel is outstanding.

From Table 1, the covering materials prepared in the embodiments have a larger effect of reducing the cigarette odor compared with the comparative example. That is, the same result is shown in the sensory test as in the adsorption test.

According to the above-mentioned results, it is apparent that the synthetic resin compositions of the embodiments have a superior deodorization characteristic compared with the comparative example.

(Embodiment 4)

With an acrylic emulsion (solid component 50%) having a butyl acrylate/ethyl acrylate/ acrylic acid=74/25/1 (weight ratio) polymer ratio and a −25° C. glass transition temperature (Tg: the value measured by the dynamic viscous elasticity measuring device "Reometrict PSA 11"produced by Reometric Corp., the same is applied to the embodiments hereinafter) of the film as the polymer latex, synthetic resin compositions for a covering material were obtained by the method mentioned below.

90 parts by weight of the copper sulfate impregnated silica gel the same as the embodiment 1 and 90 parts by weight of an activated carbon having a 63 μm or less particle size were mixed in a dry process. A solution prepared by dissolving 1 part by weight of sodium alkylnaphthalene sulfonate (weight-average molecular weight: 342) as a surfactant, 2.5 parts by weight of polyoxyethylene nonyl ether (weight-average molecular weight: 600) and 2.5 parts by weight of hydroxyethyl cellulose (weight-average molecular weight: 250,000) in 366 parts by weight of water was added thereto and mixed with a biaxial mixer. Then, 250 parts by weight of the above-mentioned acrylic emulsion (solid component: 50%) was added and mixed so as to prepare a synthetic resin composition having a 38 wt. % of solid component.

The aging stability of the obtained synthetic resin composition is shown in Table 2. As to the aging stability, the viscosity change from immediately after preparation to after storage for a predetermined period is measured at a room temperature and at 50° C., respectively. The viscosity was measured by a BM type viscometer under a 60 rpm rotation condition with a #4 rotor.

Then, 145 g (solid component: 55 g) of the obtained synthetic resin composition was applied on the rear surface of a plain-woven fabric comprising polyester fibers having a size of 40 cm width, 125 cm length and 2 mm thickness with a doctor blade by 90 g/m² by the solid component. Then, it was dried in a hot air drier at 130° C. for 10 minutes so as to obtain a vehicle interior covering material having a 2.5 mm thickness. The characteristics (feeling and deodorization performance) of the obtained covering material are shown in Table 3.

(Embodiment 5)

A solution prepared by dissolving i part by weight of sodium alkylnaphthalene sulfonate (weight-average molecular weight: 342) as a surfactant, 2.5 parts by weight of polyoxyethylene nonyl ether (weight-average molecular weight: 2,000) and 2.5 parts by weight of hydroxyethyl cellulose (weight-average molecular weight: 250,000) in 366 parts by weight of water was added to 250 parts by weight of the acrylic emulsion the same as the embodiment 4 and mixed. Further, the material prepared by mixing 90 parts by weight of the copper sulfate impregnated silica gel and 90 parts by weight of an activated carbon having a 63 μm or less particle size in a dry process as in the embodiment 1 was added thereto so as to prepare a synthetic resin composition (solid component: 38 wt. %).

The aging stability of the synthetic resin composition was examined as in the embodiment 4, and the results are shown in Table 2. Further, a covering material was prepared according to the application as in the embodiment 4, and the characteristics thereof are shown in Table 3.

COMPARATIVE EXAMPLE 2

A solution prepared by dissolving 1 part by weight of sodium alkylnaphthalene sulfonate (weight-average molecular weight: 342) as a surfactant and 2.5 parts by weight of carboxymethyl cellulose (weight-average molecular weight: 130,000) in 366 parts by weight of water was added to 250 parts by weight of the acrylic emulsion the same as the embodiment 4 and mixed. Further, the material prepared by mixing 90 parts by weight of the copper sulfate impregnated silica gel and 90 parts by weight of an activated carbon having a 63 μm or less particle size in a dry process as in the embodiment 1 was added thereto so as to prepare a synthetic resin composition (solid component: 38 wt. %).

The aging stability of the synthetic resin composition was examined as in the embodiment 4, and the results are shown in Table 2. Further, a covering material was prepared according to the application as in the embodiment 4, and the characteristics thereof are shown in Table 3.

COMPARATIVE EXAMPLE 3

A solution prepared by dissolving 1 part by weight of sodium alkylnaphthalene sulfonate (weight-average molecular weight: 342) as a surfactant and 2.5 parts by weight of sodium polyacrylate (weight-average molecular weight: 15,000) in 366 parts by weight of water was added to 250 parts by weight of the acrylic emulsion the same as the embodiment 4 and mixed. Further, the material prepared by mixing 90 parts by weight of the copper sulfate impregnated silica gel and 90 parts by weight of an activated carbon having a 63 μm or less particle size in a dry process as in the embodiment 1 was added thereto so as to prepare a synthetic resin composition (solid component: 38 wt. %).

The aging stability of the synthetic resin composition was examined as in the embodiment 4, and the results are shown in Table 2. Further, a covering material was prepared according to the application as in the example 4, and the characteristics thereof are shown in Table 3.

<Evaluation>

TABLE 2

| time passage | | embodiment 4 | embodiment 5 | comparative example 2 | comparative example 3 |
|---|---|---|---|---|---|
| | | viscosity (mPa.S) | | | |
| immediately after preparation | | 1500 | 1700 | 1400 | 1500 |
| room temperature | after 1 week | 1550 | 1760 | 3000 | 3600 |
| | after 1 month | 1550 | 1780 | 5800 | 6900 |
| 50° C. | after 1 week | 1550 | 1780 | 9000 | 9500 |
| | after 1 month | 1600 | 1800 | gelation | gelation |

TABLE 3

| | embodiment 4 | embodiment 5 | comparative example 2 | comparative example 3 |
|---|---|---|---|---|
| feeling | good | good | good | good |
| deodorization performance | good | good | slightly poor | slightly poor |

From Table 2, it is observed that the synthetic resin compositions according to respective embodiments have excellent stability. Further, from Table 3, it is apparent that the fabrics applied with the synthetic resin compositions according to the embodiments have superior feeling and deodorization performance.

(Embodiment 6)

In the process the same as the embodiment 4 except that an SBR latex (solid component: 50%) having a styrene/butadiene/acrylic acid=50/47/3 polymer composition and a −35° C. measured Tg of the film was used in place of the acrylic emulsion, a synthetic resin composition having a 38% solid component was prepared.

The aging stability of the synthetic resin composition was examined as in the embodiment 4, and the results are shown in Table 4. Further, a covering material was prepared according to the application as in the embodiment 4, and the characteristics thereof are shown in Table 5.

(Embodiment 7)

In the process the same as the embodiment 4 except that an ethylene/vinyl acetate copolymer emulsion (solid component: 50%) having a vinyl acetate/ethylene=80/20 polymer composition and a −5° C. measured Tg of the film was used in place of the acrylic emulsion, a synthetic resin composition having a 38% solid component was prepared.

The aging stability of the synthetic resin composition was examined as in the embodiment 4, and the results are shown in Table 4. Further, a covering material was prepared according to the application as in the embodiment 4, and the characteristics thereof are shown in Table 5.

(Embodiment 8)

In the process the same as the embodiment 4 except that a polyurethane (solid component: 50%) having a −15° C. measured Tg of the film prepared by reacting a polyester having a 1,4 butane diol/adipic acid polymer composition and dimethylol propionic acid/trilene diisocyanate in a solvent, chain expansion and water dispersion of the reaction product in water in the presence of anhydrous piperazine/triethyl amine, and performing solvent removal, was used in place of the acrylic emulsion, a synthetic resin composition having a 38% solid component was prepared.

The aging stability of the synthetic resin composition was examined as in the embodiment 4, and the results are shown in Table 4. Further, a covering material was prepared according to the application as in the embodiment 4, and the characteristics thereof are shown in Table 5.

COMPARATIVE EXAMPLE 4

In the process the same as the embodiment 6 except that sodium polyacrylate having a 15,000 weight-average molecular weight was used in place of the hydroxyethyl cellulose having a 250,000 weight-average molecular weight, a synthetic resin composition having a 38% solid component was prepared.

The aging stability of the synthetic resin composition was examined as in the embodiment 4, and the results are shown in Table 4. Further, a covering material was prepared according to the application as in the embodiment 4, and the characteristics thereof are shown in Table 5.

COMPARATIVE EXAMPLE 5

In the process the same as the embodiment 7 except that sodium polyacrylate having a 15,000 weight-average molecular weight was used in place of the hydroxyethyl cellulose having a 250,000 weight-average molecular weight, a synthetic resin composition having a 38% solid component was prepared.

The aging stability of the synthetic resin composition was examined as in the embodiment 4, and the results are shown in Table 4. Further, a covering material was prepared according to the application as in the embodiment 4, and the characteristics thereof are shown in Table 5.

(Comparative Example 6)

In the process the same as the embodiment 8 except that sodium polyacrylate having a 15,000 weight-average molecular weight was used in place of the hydroxyethyl cellulose having a 250,000 weight-average molecular weight, a synthetic resin composition having a 38% solid component was prepared.

The aging stability of the synthetic resin composition was examined as in the embodiment 4, and the results are shown in Table 4. Further, a covering material was prepared according to the application as in the embodiment 4, and the characteristics thereof are shown in Table 5.

<Evaluation>

TABLE 4

|  | embodiments | | | comparative examples | | |
|---|---|---|---|---|---|---|
| time passage | 6 | 7 | 8 | 4 | 5 | 6 |
| immediately after preparation room temperature | 1800 | 1400 | 1500 | 1700 | 1500 | 1700 |
| after 1 week | 1850 | 1400 | 1500 | 3500 | 3200 | 3600 |
| after 1 month 50° C. | 1850 | 1400 | 1550 | 5600 | 4900 | 5200 |
| after 1 week | 1850 | 1450 | 1550 | gel | gel | 8900 |
| after 1 month | 1900 | 1450 | 1600 | — | — | gel |

TABLE 5

|  | embodiments | | | comparative examples | | |
|---|---|---|---|---|---|---|
|  | 6 | 7 | 8 | 4 | 5 | 6 |
| feeling | good | slightly hard | good | good | slightly hard | good |
| deodorization performance | good | good | good | slightly poor | slightly poor | slightly poor |

From Tables 4 and 5, it is observed that the synthetic resin compositions according to the embodiments 6 to 8 have a superior stability compared with the comparative embodiments 4 to 6, and further, the fabrics applied with the synthetic resin compositions according to the embodiments have good feeling and deodorization performance.

(Embodiment 9) 90 parts by weight of the copper sulfate impregnated silica gel the same as the embodiment 1 and 90 parts by weight of an activated carbon having a 63 pm or less particle size were mixed in a dry process. A solution prepared by dissolving 0.9 part by weight of sodium alkylnaphthalene sulfonate (weight-average molecular weight: 342) as a surfactant, 3 parts by weight of polyoxyethylene nonyl ether (HLB=12) and 2.5 parts by weight of hydroxyethyl cellulose (weight-average molecular weight: 250,000) in 366 parts by weight of water was added thereto and mixed with a biaxial mixer. Then, 200 parts by weight of the polymer latex the same as the embodiment 1 was added and mixed so as to prepare a synthetic resin composition having a 38 wt. % of non-volatile component.

The obtained synthetic resin composition was mechanically foamed to 2.5 times by an oaks mixer. Then, it was applied to the rear surface of a fabric comprising polyester fibers with a doctor blade by 80 g/m$^2$ by the solid component. Then, it was dried in a hot air drier at 130° C. for 20 minutes.

The foam stability of the above-mentioned synthetic resin composition after mechanical foaming was evaluated, and the results are shown in Table 6. Moreover, the deodorization performance and the seam fatigue of the fabrics applied with the above-mentioned synthetic resin composition and dried were evaluated, and the results are shown in Table 6.

The foam stability was evaluated by placing 200 g of the synthetic resin composition in a 500 ml polyester container, agitating the same with a hand mixer for domestic use at a 450 rpm maximum number of revolution for 2 minutes, and observing the state of the foams after 5 minutes and 20 minutes according to the criteria "dense foams obtained immediately after agitation are maintained" as A, "a part of the foams are broken so as to become larger foams" as B, and "most of the foams are broken" as C. The deodorization performance was evaluated by the odor strength and the degree of pleasantness and unpleasantness as in the above-mentioned cigarette stain test.

Moreover, the seam fatigue test was executed by repeatedly pulling test pieces with a 3 kg load with an Asumura type woven fabric wearing tester. The state of falling out of the seam after 2,500 times of pulling was observed and evaluated. The test pieces were produced by taking two or more sets of test pieces cut in a size of 10 cm width and 10 cm length in a pair of the vertical and lateral directions, superimposing the surface side of the two test pieces, attaching the same by sewing along one side at a position from 10 mm from the rim of the side with a sewing machine, and forming total 4 lines of cutting of a 88 mm length at a position from 25 mm from the rim of two sides perpendicular to the side parallel to the two sides (that is, the distance between the parallel two cuttings is 50 mm). In the test, the tester holds a position between the two parallel cuttings of the test pieces. In Table 6, those having a 1.7 mm or less seam falling out are marked with A, and those having a 1.7 mm or more are marked with C.

(Embodiment 10)

In the process the same as the embodiment 9 except that 3 parts by weight of polyoxyethylene nonyl ether (HLB=8) was used in place of the polyoxyethylene nonyl ether (HLB=12), a synthetic resin composition having a 38 wt. % non-volatile component was prepared. The characteristics were evaluated as in the embodiment 9, and the results are shown in Table 6.

(Embodiment 11[for comparison])

In the process the same as the embodiment 9 except that 3 parts by weight of polyoxyethylene nonyl ether (HLB=14) was used in place of the polyoxyethylene nonyl ether (HLB=12), a synthetic resin composition having a 38 wt. % non-volatile component was prepared. The characteristics were evaluated as in the embodiment 9, and the results are shown in Table 6.

(Embodiment 12 [for comparison])

In the process the same as the embodiment 9 except that 3 parts by weight of polyoxyethylene nonyl ether (HLB =17.8) was used in place of the polyoxyethylene nonyl ether (HLB =12), a synthetic resin composition having a 38 wt. % non-volatile component was prepared. The characteristics were evaluated as in the embodiment 9. and the results are shown in Table 6.

(Embodiment 13 [for comparison])

In the process the same as the embodiment 9 except that the synthetic resin of the embodiment 9 was not foamed, a synthetic resin composition was applied on a fabric and the deodorization performance was evaluated in the same manner. The results are shown in Table 6.

<Evaluation>

TABLE 6

|  | embodiment 9 | embodiment 10 | embodiment 11 | embodiment 12 | embodiment 13 |
|---|---|---|---|---|---|
| HLB of the nonionic compound | 12 | 8 | 14 | 17.8 | 12 |
| processing method | foamed | foamed | foamed | foamed | not foamed |
| foam stability |  |  |  |  |  |
| after 5 minutes | A | A | B | C | — |
| after 20 minutes | A | A | C | C | — |
| odor strength | 1.2 | 1.2 | 2.1 | 2.3 | 2.8 |
| degree of pleasantness and unpleasantness | −0.5 | −0.6 | −1.2 | −1.2 | −1.3 |
| seam fatigue | A | A | A | A | A |

As apparent from Table 6, the synthetic resin compositions according to the embodiments 9 and 10 have the good foam stability and excellent deodorization performance. In contrast, the synthetic resin compositions according to the embodiments 1 and 12 have a poorer foam stability compared with the embodiments 9 and 10, and a low deodorization performance as the embodiment 13 where a forming operation was not executed. That is, it is apparent that the synthetic resin compositions according to the embodiments 9 and 10 have the particularly high characteristics by the effect of using a nonionic compound having a less than 10,000 weight-average molecular weight with a 12 or less HLB.

As to the seam fatigue, the synthetic resins of the embodiments were good.

Therefore, it is learned that the synthetic resin compositions according to the present invention show a high bonding strength.

(Embodiment 14)

50 parts by weight of ion exchanged water was placed in a flask with four inlets and heated to 80° C. in a nitrogen air flow. Then, a polymerization initializing agent was added thereto, and an emulsified mixture with the composition shown in Table 7 was dropped over 3 hours. At the time, the reaction temperature was controlled to 78 to 82° C. After finishing the dropping operation, the reaction was continued while agitating and maintaining at the same temperature for 2 hours. Then, it was cooled down, and the pH thereof was adjusted to 3.5 to 4.5 with a 14% aqueous ammonia so as to obtain a stable polymer latex having a 50.2% solid component, a 0.35 μm particle size and a 800 mPa·s viscosity.

90 parts by weight of the copper sulfate impregnated silica gel the same as the embodiment 1, 90 parts by weight of an activated carbon having a 63 μm or less particle size, and 70 parts by weight of a flame retardant prepared by mixing with an antimony trioxide (particle size: 1 μm)/decabromo diphenyl oxide (particle size: 10 μm)=1/1 weight ratio were mixed in a dry process. A solution prepared by dissolving 3 parts by weight of sodium alkylnaphthalene sulfonate (weight-average molecular weight: 342) as a surfactant, 2 parts by weight of polyoxyethylene nonyl ether (weight-average molecular weight: 567) and 2.5 parts by weight of hydroxyethyl cellulose (weight-average molecular weight: 250,000) in 625 parts by weight of water was added thereto and mixed with a biaxial mixer. Then, 200 parts by weight of the above-mentioned polymer latex was added and mixed so as to prepare a synthetic resin composition having a 33 wt. % of non-volatile component.

The obtained synthetic resin composition was applied to the rear surface of a fabric comprising polyester fibers with a doctor blade by 120 g/m² by the solid component. Then, it was dried in a hot air drier at 130° C. for 30 minutes so as to obtain a vehicle interior covering material. The adhesion amount of the filler and the flame retardant was 5 g/m² of the flame retardant, 30 g/m² of the activated carbon and 30 g/m² of the copper sulfate impregnated silica gel.

TABLE 7

| n butyl acrylate | 93.5 parts by weight |
|---|---|
| acrylonitrile | 5.0 parts by weight |
| acrylic acid | 1.5 parts by weight |
| polyoxyethylene styrenated phenyl ether (molecular weight: 632) | 0.5 parts by weight |
| polyoxyethylene styrenated phenyl ether (molecular weight: 2,392) | 3.5 parts by weight |
| sodium polyoxyethylene nonyl phenylether sulfate (molecular weight: 1,071) | 0.5 parts by weight |
| ion exchanged water | 101.6 parts by weight |
| ammonium persulfate | 0.5 parts by weight |
| sodium hydrogensulfite | 0.5 parts by weight |

(Embodiment 15)

In the process the same as the embodiment 14 except that 3.0 parts by weight of the polyoxyethylene styrenated phenylether and 1.5 parts by weight of the sodium polyoxyethylene nonyl phenylether sulfate as the anionic emulsifier were used, a stable polymer latex having a 50.3% solid component, a 0.30 μm particle size and a 1,200 mPa·s viscosity was prepared by emulsion polymerization. Then, in the process the same as the embodiment 14 except that the polymer latex was used, a synthetic resin composition of the embodiment 15 was prepared.

The obtained synthetic resin composition was applied to the rear surface of a fabric comprising polyester fibers with a doctor blade by 120 g/m² by the solid component. Then, it was dried in a hot air drier at 130° C. for 30 minutes so as to obtain a vehicle interior covering material. The adhesion amount of the filler and the flame retardant was 5 g/m² of the flame retardant, 30 g/m² of the activated carbon and 30 g/m² of the copper sulfate impregnated silica gel.

(Embodiment 16)

In the process the same as the embodiment 14 except that 2.0 parts by weight of the polyoxyethylene styrenated phenylether and 2.5 parts by weight of the sodium polyoxyethylene nonyl phenylether sulfate as the anionic emulsifier were used, a polymer latex having a 50.1% solid component, a 0.20 μm particle size and a 3,300 mPa·s viscosity was prepared by emulsion polymerization. Then, in the process the same as the embodiment 14 except that the polymer latex was used, a synthetic resin composition of the embodiment 16 was prepared.

The obtained synthetic resin composition was applied to the rear surface of a fabric comprising polyester fibers with a doctor blade by 120 g/m² by the solid component. Then, it was dried in a hot air drier at 130° C. for 30 minutes so as to obtain a vehicle interior covering material. The adhesion amount of the filler and the flame retardant was 5 g/m² of the flame retardant, 30 g/m² of the activated carbon and 30 g/m² of the copper sulfate impregnated silica gel.

COMPARATIVE EXAMPLE 7

In the process the same as the embodiment 14 except that polyoxyethylene nonyl phenolether was used in place of the polyoxyethylene styrenated phenylether, a polymer latex having a 50.4% solid component, a 0.25 μm particle size and a 1,300 mPa·s viscosity was prepared by emulsion polymerization. Then, in the process the same as the embodiment 14 except that the polymer latex was used, a synthetic resin composition of the comparative example 7 was prepared.

The obtained synthetic resin composition was applied to the rear surface of a fabric comprising polyester fibers with a doctor blade by 120 g/m² by the solid component. Then, it was dried in a hot air drier at 130° C. for 30 minutes so as to obtain a vehicle interior covering material. The adhesion amount of the filler and the flame retardant was 5 g/m² of the flame retardant, 30 g/m² of the activated carbon and 30 g/m² of the copper sulfate impregnated silica gel.

COMPARATIVE EXAMPLE 8

In the process the same as the embodiment 14 except that 4.5 parts by weight of sodium polyoxyethylene nonyl phenylether sulfate was used instead of using the polyoxyethylene styrenated phenylether, a polymer latex having a 50.3% solid component, a 0.15 μm particle size and a 4,000 mPa·s viscosity was prepared by emulsion polymerization. Then, in the process the same as the embodiment 14 except that the polymer latex was used, a synthetic resin composition of the comparative example 8 was prepared.

The obtained synthetic resin composition was applied to the rear surface of a fabric comprising polyester fibers with a doctor blade by 120 g/m² by the solid component. Then, it was dried in a hot air drier at 130° C. for 30 minutes so as to obtain a vehicle interior covering material. The adhesion amount of the filler and the flame retardant was 5 g/m² of the flame retardant, 30 g/m² of the activated carbon and 30 g/m² of the copper sulfate impregnated silica gel.

<Test·Evaluation>

The dispersion property of the above-mentioned 5 kinds of the synthetic resin compositions were judged and evaluated by visual observation. Moreover, the state after leaving for 1 weak at a room temperature and at 50° C. was judged by visual observation respectively for each synthetic resin composition for evaluating the storage stability. Furthermore, with the obtained 5 kinds of the covering materials, the combustibility was measured based on the MVSS-302, and the odor strength and the degree of pleasantness and unpleasantness were measured as in the embodiments 1 to 3. Furthermore, the seam fatigue test was executed as in the embodiment 9. The results are shown in Table 8.

In Table 8, A in the dispersion property denotes good, and B denotes slight generation of precipitation. Further, A in the storage stability denotes absence of thickening, B denotes slight thickening, and C denotes generation of lumps or gelation. ∞ in the combustibility denotes a large irregularity. A in the seam fatigue denotes a 1.7 mm or less fall out of the seam, and B denotes a 1.8 to 2.2 mm fall out.

TABLE 8

|  | embodiment 14 | embodiment 15 | embodiment 16 | comparative example 7 | comparative example 8 |
|---|---|---|---|---|---|
| styrenated phenylether nonionic emulsifier | 4 parts by weight | 3.0 parts by weight | 2.0 parts by weight | — | — |
| anionic emulsifier | 0.5 parts by weight | 1.5 parts by weight | 2.5 parts by weight | 0.5 parts by weight | 4.5 parts by weight |
| nonionic emulsifier | — | — | — | 4 parts by weight | — |
| dispersion property at the time of preparation storage stability | A | A | A | B | B |
| room temperature | A | A | B | lumps generated | lumps generated |
| 50° C. | A | A | B | gelation | gelation |
| combustibility | 5N | 5N | 3N-2n | ∞ | ∞ |
| odor strength | 1.2 | 1.2 | 1.3 | 1.3 | 1.3 |
| degree of pleasantness and unpleasantness | −0.5 | −0.7 | −0.6 | −0.7 | −0.7 |
| seam fatigue | A | A | A | B | B |

From Table 8, it is learned that the synthetic resin compositions according to the embodiments 14 to 16 have superior dispersion property and storage stability compared with the synthetic resin compositions according to the comparative examples 7 to 8. Moreover, it is learned that the covering materials applied with the synthetic resin compositions according to the embodiments 14 to 16 have a higher deodorization performance, a good seam fatigue property and a stable flame retarding property, and thus the flame retardant is distributed homogeneously compared with the comparative examples. Apparently, this is the effect of using a polymer latex prepared by emulsion polymerization in the presence of an emulsifier comprising a styrenated phenylether nonionic emulsifier and an anionic emulsifier.

Moreover, from the comparison among the embodiments, the embodiments 14 to 15 show the results superior to those of the embodiment 16. Apparently, this is the effect of having a solid component weight ratio of styrenated phenylether nonionic emulsifier/anionic emulsifier of 1 or more.

Test Example 4 kinds of specimens were prepared by adding chemicals shown in Table 9 by the amount shown in Table 9 to the synthetic resin composition prepared in the embodiment 1 and mixing. Each specimen was applied on a moquette with a metal ruler by the same amount, and dried by heating at 130° C. for 30 minutes. Moreover, a test piece applied with the synthetic resin composition of the embodiment 1 without adding a chemical was prepared as a blank. Then, total of 5 kinds of the test pieces were prepared.

TABLE 9

| chemical name | weight % [wt. %] |
|---|---|
| toluene | 5 |
| isopropyl alcohol | 5 |
| fluorine type surfactant ("Mega Fac F-831" produced by Dai-Nippon Ink Chemical Industry Corp.) | 0.6 |
| silicon type surfactant ("Permeating agent 348" produced by Bic Chemie Japan Corp.) | 0.6 |

The pile fiber maintenance property was evaluated by visually judging the pile amount adhered on the adhesive tape after attaching an adhesive tape to the application surface and the rear side surface of the obtained 5 kinds of the test pieces and peeling the tape vigorously. The results are shown in Table 10. A denotes a slight pile adhesion amount to the adhesive tape, B denotes a relatively large pile adhesion amount to the adhesive tape, and C denotes an extremely large pile adhesion amount to the adhesive tape.

Figure 6:
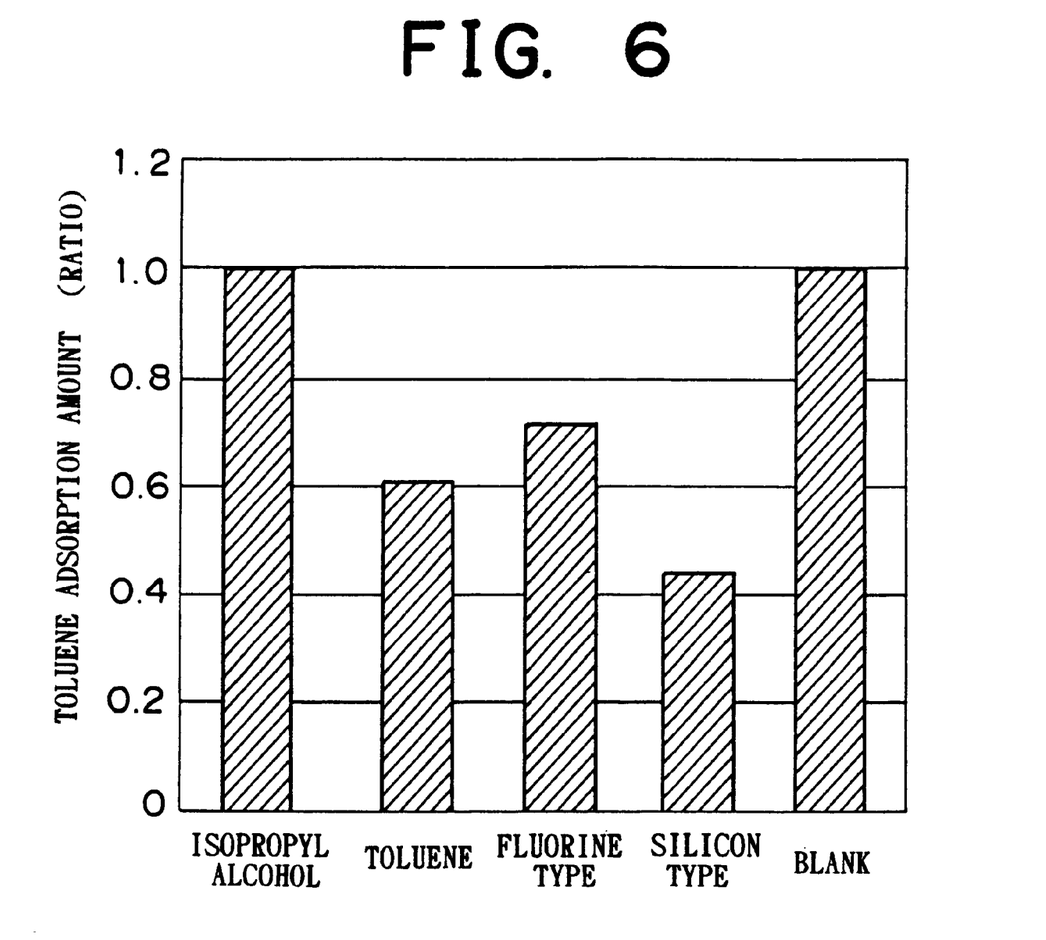
FIG. 6 is a graph showing the toluene adsorption amount at a 10 ppm equilibrium concentration of covering materials applied with a synthetic resin composition with various kinds of chemicals added thereto.

The adsorption test the same as in the embodiment 1 was executed for each test piece in the same process as in the above-mentioned adsorption test except that only toluene was used in place of the four kinds of the malodor causing substances. According to the test, the adsorption isothermal lines of the test pieces were produced, and the toluene adsorption amount in the case of an equilibrium concentration 10 ppm was measured. The results are shown in FIG. 6 and Table 10. FIG. 6 is indicated by a relative value based on the toluene adsorption amount by the blank as being 1.

TABLE 10

| chemical kind | not added | isopropyl alcohol | toluene | fluorine type surfactant | silicon type surfactant |
|---|---|---|---|---|---|
| addition amount | — | 5 wt. % | 5 wt. % | 0.6 wt. % | 0.6 wt. % |
| pile fiber maintenance property | C | A | A | B | B |
| deodorization performance | A | A | B | B | C |

From Table 10 and FIG. 6, it is learned that one containing isopropyl alcohol shows a high deodorization performance equivalent to the one without adding a chemical, and further, has the excellent pile fiber maintenance property. That is, it is apparent that the permeability to the covering property can be improved without ruining the adsorption performance by including isopropyl alcohol in a synthetic resin composition according to the present invention.

That is, a synthetic resin composition according to the present invention can reduce the malodor by being applied on a fabric, and thus it can be used preferably as a deodorant in a residence or a vehicle compartment.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a dingle element, are also within the spirit and scope of the invention.

What is claimed is:

1. A synthetic resin composition comprising:

a polymer latex prepared by emulsion polymerization in the presence of a styrenated phenylether nonionic emulsifier and an anionic emulsifier;

a filler containing a silica gel with at least one selected from the group consisting of a transitional metal and a transitional metal compound supported by a silica gel carrier;

a surfactant for dispersing the polymer latex and the filler in an aqueous medium, said surfactant comprising a nonionic first polymer having a weight-average molecular weight of 10,000 or greater and a second polymer compound having a weight-average molecular weight of from 150 to less than 10,000 and containing at least one kind of nonionic polymer compound; and a flame retardant.

2. The synthetic resin composition according to claim 1, wherein the filler further contains an activated carbon.

3. The synthetic resin composition according to claim 2, wherein the filler contains the activated carbon by 5 to 90 wt. %.

4. The synthetic resin composition according to claim 1, wherein the first polymer compound group is a cellulose polymer compound.

5. The synthetic resin composition according to claim 1, wherein the second polymer compound group has a 12 or less hydrophile-lipophile balance.

6. The synthetic resin composition according to claim 5, wherein the surfactant further comprises aromatic alkylsulfonate having a weight-average molecular weight of from 150 to less than 10,000.

7. The synthetic resin composition according to claim 1, wherein the specific surface area of the silica gel is 501 m$^2$/g-800 m$^2$/g.

8. The synthetic resin composition according to claim 1, further comprising an alcohol solvent.

9. The synthetic resin composition according to claim 1, wherein the polymer latex is a polymer prepared by polymer emulsion of a vinyl monomer.

10. The synthetic resin composition according to claim 1, wherein a mixing ratio of the styrenated phenylether nonionic emulsifier and the anionic emulsifier at the time of polymerizing the polymer latex is nonionic emulsifier/anionic emulsifier=50/50 to 95/5 based on solid component weight ratio.

* * * * *